US011952943B2

United States Patent
Anand et al.

(10) Patent No.: US 11,952,943 B2
(45) Date of Patent: Apr. 9, 2024

(54) ASSEMBLY FOR A COMPRESSOR SECTION OF A GAS TURBINE ENGINE

(71) Applicant: PRATT & WHITNEY CANADA CORP., Longueuil (CA)

(72) Inventors: Karan Anand, Mississauga (CA); Hong Yu, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/213,823

(22) Filed: Jun. 24, 2023

(65) Prior Publication Data
US 2023/0332541 A1 Oct. 19, 2023

Related U.S. Application Data

(63) Continuation-in-part of application No. 16/705,452, filed on Dec. 6, 2019.

(51) Int. Cl.
*F02C 9/20* (2006.01)
*F01D 17/14* (2006.01)
*F02C 3/04* (2006.01)
*F02C 7/042* (2006.01)
*F02C 9/54* (2006.01)

(52) U.S. Cl.
CPC ............ *F02C 7/042* (2013.01); *F01D 17/141* (2013.01); *F02C 3/04* (2013.01); *F02C 9/20* (2013.01); *F02C 9/54* (2013.01)

(58) Field of Classification Search
CPC ............... F02C 9/20; F02C 9/54; F02C 7/057
See application file for complete search history.

(56) References Cited

U.S. PATENT DOCUMENTS

| 3,617,147 | A | 11/1971 | Bragg |
| 4,013,377 | A | 3/1977 | Amos |
| 4,856,962 | A | 8/1989 | McDow |
| 5,314,301 | A | 5/1994 | Knight |
| 8,696,306 | B2 | 4/2014 | Clemen |
| 10,094,223 | B2 | 10/2018 | Yu et al. |
| 2010/0166543 | A1 | 7/2010 | Carroll |
| 2017/0268537 | A1 | 9/2017 | Mielke et al. |

FOREIGN PATENT DOCUMENTS

| EP | 2775098 A2 | 10/2014 |
| EP | 3121383 A1 | 1/2017 |
| EP | 3339572 A1 | 6/2018 |
| EP | 3467259 A1 | 4/2019 |
| GB | 2405184 A | 2/2005 |
| JP | S5246215 A | 4/1977 |

OTHER PUBLICATIONS

European Patent Office, Communication re: extended European search report re: European patent application No. 20212262.8, dated Apr. 1, 2021.

*Primary Examiner* — Gerald L Sung
(74) *Attorney, Agent, or Firm* — Norton Rose Fulbright Canada LLP (57) ABSTRACT

Assemblies and methods for directing a flow of air through a compressor section of a gas turbine engine are disclosed. A method includes receiving the flow of air over a strut extending radially across a substantially annular gas path of the gas turbine engine, and at least partially confining and modifying a strut wake generated in the flow of air by the strut using one or more variable orientation guide vanes.

13 Claims, 11 Drawing Sheets

ASSEMBLY FOR A COMPRESSOR SECTION OF A GAS TURBINE ENGINE

CROSS REFERENCE TO RELATED APPLICATION

This application is a continuation-in-part of U.S. patent application Ser. No. 16/705,452 filed on Dec. 6, 2019, the entire contents of which are hereby incorporated herein by reference.

TECHNICAL FIELD

The disclosure relates generally to gas turbine engines, and more particularly to assemblies including one or more struts and variable orientation guide vanes as may be present in a compressor section of a gas turbine engine.

BACKGROUND

In a gas turbine engine, air is pressurized by rotating blades, mixed with fuel and then ignited for generating hot combustion gases which flow downstream through a turbine for extracting energy therefrom. The air is channelled through circumferential rows of fan and/or compressor blades which pressurize the air in turn. Load bearing struts may be disposed in the gas path upstream of downstream rotors and interact with the flow of air. The presence of such struts in the flow of air may induce undesirable flow conditions and energy losses in the flow of air.

SUMMARY

In one aspect, the disclosure describes an assembly for a compressor section of a gas turbine engine. The assembly comprises:
  an outer shroud and an inner shroud defining a substantially annular gas path therebetween, the gas path having a central axis and extending axially along the central axis;
  a plurality of struts extending radially in the gas path, the struts angularly spaced-apart around the central axis, two adjacent struts defining a strut passage therebetween, the strut passage extending axially along the central axis between leading edges of the two adjacent struts and trailing edges of the two adjacent struts; and
  a plurality of variable orientation guide vanes extending radially in the gas path, the variable orientation guide vanes uniformly angularly spaced-apart around the central axis, one or more of the variable orientation guide vanes having a leading edge axially overlapping the strut passage at one or more orientations of the one or more of the variable orientation guide vanes.

In another aspect, the disclosure describes a gas turbine engine comprising:
  a compressor for pressurizing air;
  a combustor in which the compressed air is mixed with fuel and ignited for generating a stream of hot combustion gases; and
  a turbine section for extracting energy from the combustion gases;
  the compressor including:
  a substantially annular gas path having a central axis and extending axially along the central axis;
  a strut extending radially in the gas path;
  a strut passage defined in the gas path, the strut passage extending axially along the central axis between a leading edge of the strut and a trailing edge of the strut;
  a plurality of variable orientation guide vanes extending radially in the gas path, the variable orientation guide vanes uniformly angularly spaced-apart around the central axis, one or more of the variable orientation guide vanes having a leading edge axially overlapping the strut passage and a trailing edge disposed downstream of the strut passage at one or more orientations of the one or more of the variable orientation guide vanes; and
  a rotor disposed downstream of the plurality of variable orientation guide vanes and configured to compress the air.

In a further aspect, the disclosure describes a method of directing a flow of air through a compressor section of a gas turbine engine. The method comprises:
  receiving the flow of air over a strut extending radially across a substantially annular gas path of the gas turbine engine, the gas path having a central axis;
  at least partially confining a strut wake generated in the flow of air by the strut, the strut wake being at least partially confined between two adjacent variable orientation guide vanes angularly spaced-apart from the strut, the variable orientation guide vanes axially overlapping a portion of the strut relative to the central axis; and
  modifying the strut wake using at least one of the two variable orientation guide vanes.

In a further aspect, the disclosure describes an assembly for a compressor section of a gas turbine engine. The assembly comprises:
  an outer shroud and an inner shroud defining a substantially annular gas path therebetween, the gas path having a central axis and extending axially along the central axis;
  a plurality of struts extending radially in the gas path, the struts being angularly spaced-apart around the central axis, two adjacent struts defining a strut passage therebetween, the strut passage extending axially along the central axis between leading edges of the two adjacent struts and trailing edges of the two adjacent struts; and
  a plurality of variable orientation guide vanes extending radially in the gas path, the variable orientation guide vanes being uniformly angularly spaced-apart around the central axis, two adjacent variable orientation guide vanes of the plurality of variable orientation guide vanes having a leading edge axially overlapping the strut passage at one or more orientations of the two adjacent variable orientation guide vanes,
  wherein:
  one of the plurality of struts is angularly positioned between the two adjacent variable orientation guide vanes;
  a first of the two adjacent variable orientation guide vanes is pivotable about a pivot point; and
  a first angular spacing between the one strut and the first of the two adjacent variable orientation guide vanes is greater than a chordwise distance between the leading edge of the first of the two adjacent variable orientation guide vanes and the pivot point.

The first angular spacing between the one strut and the first of the two adjacent variable orientation guide vanes may be substantially equal to a second angular spacing between the one strut and a second of the two adjacent variable orientation guide vanes.

The first angular spacing between the one strut and the first of the two adjacent variable orientation guide vanes may be different from a second angular spacing between the one strut and a second of the two adjacent variable orientation guide vanes.

The assembly may include a greater number of the plurality of variable orientation guide vanes than the plurality of struts.

The two adjacent variable orientation guide vanes may have a trailing edge disposed outside of the strut passage.

The plurality of variable orientation guide vanes may be axially positioned downstream of an axial position of maximum thickness of the struts.

The struts may be uniformly angularly spaced-apart around the central axis.

The plurality of variable orientation guide vanes may have a same axial position. The two adjacent variable orientation guide vanes may be spaced apart from each other by a first circumferential distance.

The plurality of variable orientation guide vanes may include a third variable orientation guide vane of the plurality of variable orientation guide vanes disposed at a second circumferential distance away from the first of the two adjacent variable orientation guide vanes in a first circumferential direction about the central axis; and a fourth variable orientation guide vane of the plurality of variable orientation guide vanes disposed at a third circumferential distance away from a second of the two adjacent variable orientation guide vanes in a second circumferential direction about the central axis, the second circumferential direction being opposite the first circumferential direction. The first, second, and third circumferential distances may be measured along a radially outer surface of the inner shroud and are equal to each other.

In a further aspect, the disclosure describes a gas turbine engine comprising:
- a compressor for pressurizing air;
- a combustor in which compressed air from the compressor is mixed with fuel and ignited for generating a stream of hot combustion gases; and
- a turbine section for extracting energy from the combustion gases;
- the compressor including:
  - a substantially annular gas path having a central axis and extending axially along the central axis;
  - a strut extending radially in the gas path;
  - a strut passage defined in the gas path, the strut passage extending axially along the central axis between a leading edge of the strut and a trailing edge of the strut;
  - a plurality of variable orientation guide vanes extending radially in the gas path, the variable orientation guide vanes being uniformly angularly spaced-apart around the central axis, two adjacent variable orientation guide vanes of the plurality of variable orientation guide vanes having a leading edge axially overlapping the strut passage and a trailing edge disposed downstream of the strut passage at one or more orientations of the two adjacent variable orientation guide vanes; and
  - a rotor disposed downstream of the plurality of variable orientation guide vanes and configured to compress the air,
  - wherein:
    - the strut is angularly positioned between the two adjacent variable orientation guide vanes of the plurality of variable orientation guide vanes;
    - a first of the two adjacent variable orientation guide vanes is pivotable about a pivot point; and
    - a first angular spacing between the strut and the first of the two adjacent variable orientation guide vanes is greater than a chordwise distance between the leading edge of the first of the two adjacent variable orientation guide vanes and the pivot point.

The first angular spacing between the strut and the first of the two adjacent variable orientation guide vanes may be substantially equal to a second angular spacing between the strut and a second of the two adjacent variable orientation guide vanes.

The first angular spacing between the strut and the first of the two adjacent variable orientation guide vanes may be different from a second angular spacing between the strut and a second of the two adjacent variable orientation guide vanes.

The plurality of variable orientation guide vanes may be axially positioned downstream of an axial position of maximum thickness of the strut.

The strut may be one of a plurality of struts. The plurality of struts may be angularly spaced-apart around the central axis and extending radially in the gas path.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure relates generally to gas turbine engines, and more particularly to assemblies including one or more struts and variable orientation guide vanes as may be present in a compressor section of a gas turbine engine. In some embodiments, the assemblies and methods disclosed herein can promote better performance of gas turbine engines, such as by improving flow conditions in the compressor section in some operating conditions, improving the operable range of the compressor, reducing energy losses and aerodynamic loading on rotors.

Aspects of various embodiments are described in relation to the figures.

Figure 1:
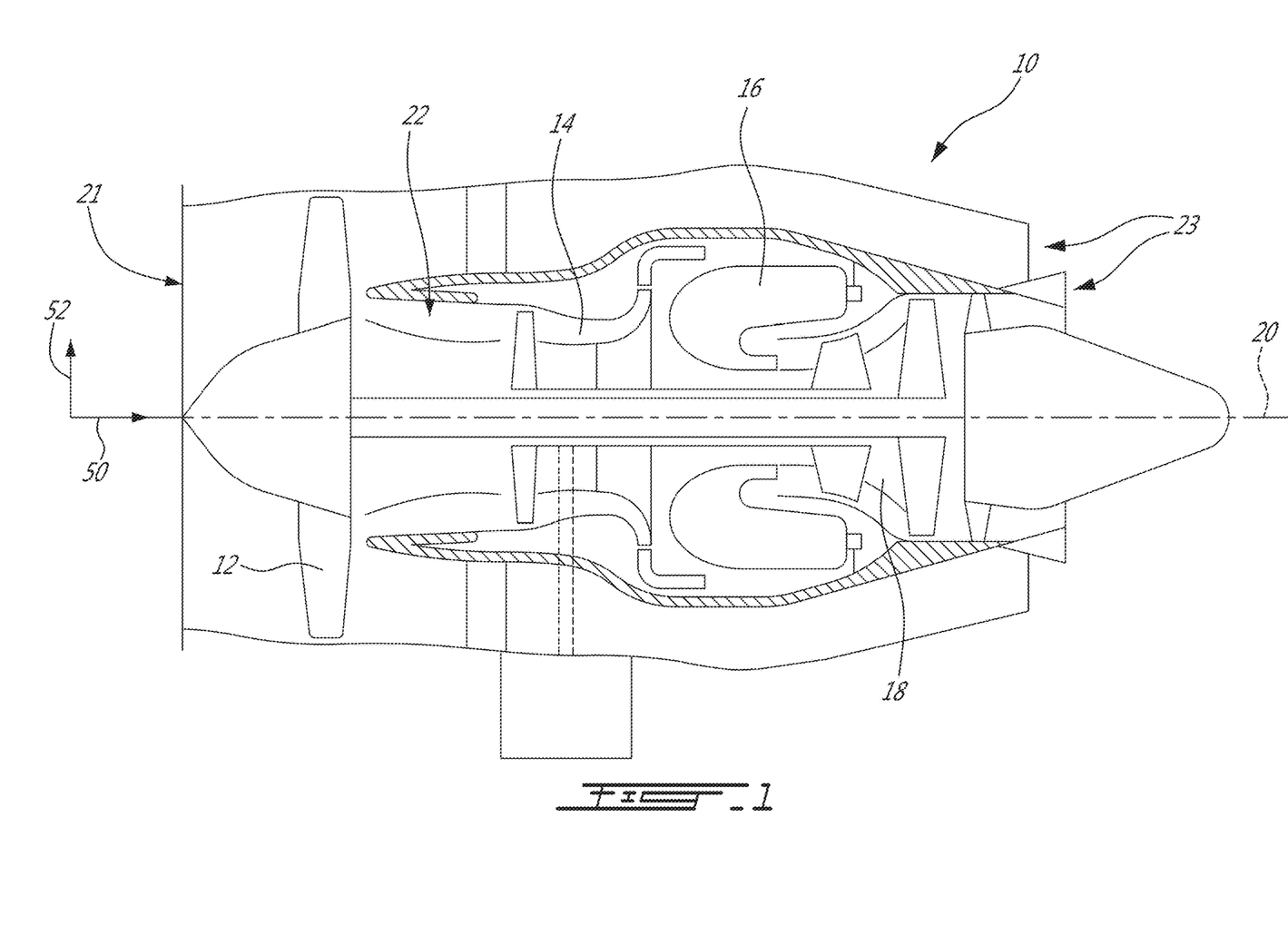
FIG. 1 shows an axial cross-section view of an exemplary gas turbine engine.

FIG. 1 shows an axial cross-section view of exemplary gas turbine engine 10. Gas turbine engine 10 generally comprises in serial flow communication: a fan 12 through which ambient air is propelled, compressor section 14 for pressurizing the air, combustor 16 in which the compressed air is mixed with fuel and ignited for generating an annular stream of hot combustion gases, and turbine section 18 for extracting energy from the combustion gases. Rotors of compressor section 14 and turbine section 18 rotate about central axis 20 of substantially annular gas path 22 (referred to hereinafter as annular gas path 22) extending between gas turbine engine inlet 21 and outlet 23. In some embodiments, gas turbine engine 10 may not include fan 12.

It should be noted that the terms "upstream" and "downstream" used herein refer to the direction of an air/gas flow passing through annular gas path 22 of gas turbine engine 10. It should also be noted that the term "axial", "radial", "angular" and "circumferential" are used with respect to central axis 20 of gas path 22, which may also be a central axis of gas turbine engine 10. In particular, we can define axial direction 50 parallel to central axis 20 and radial direction 52.

Figure 2:
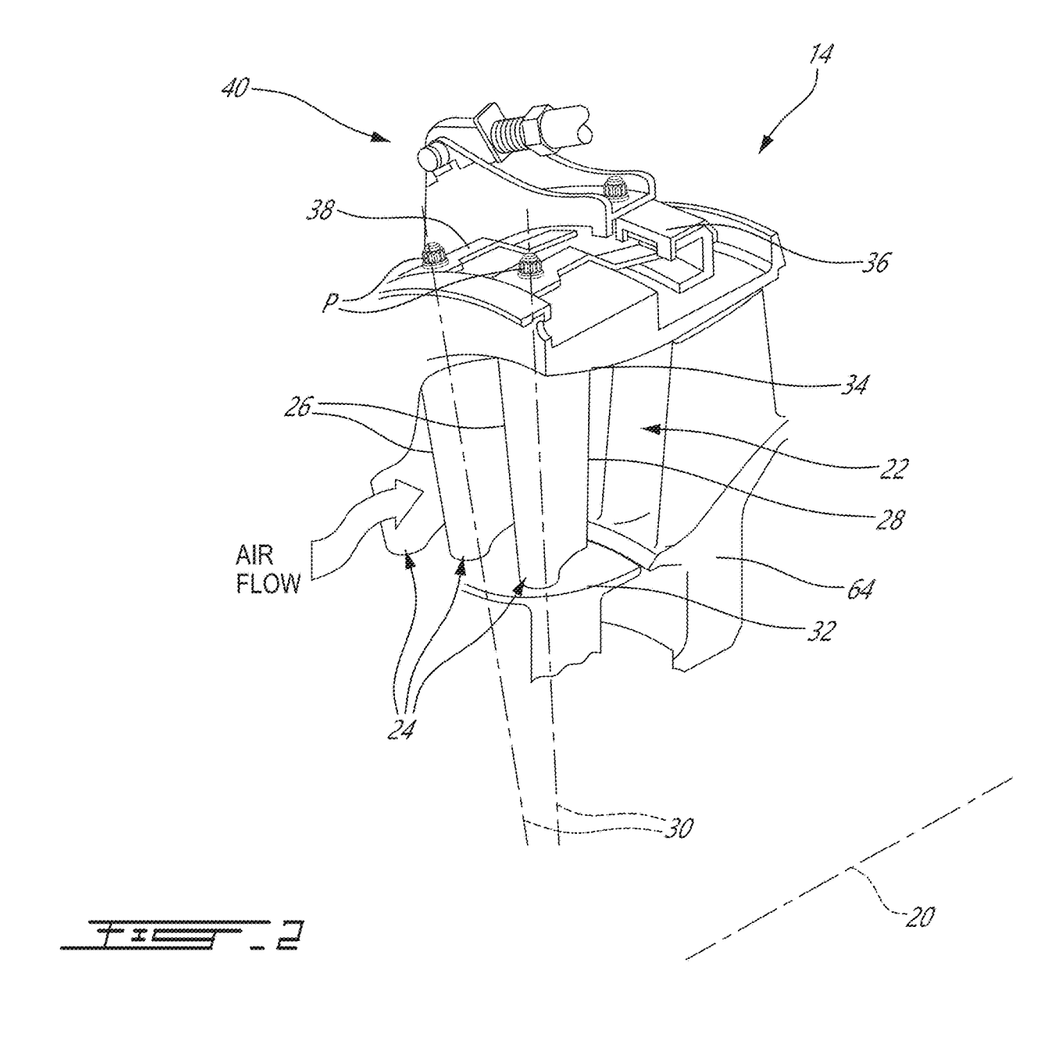
FIG. 2 shows a perspective view, partly sectioned, of a portion of an exemplary compressor section of the gas turbine engine of FIG. 1.

FIG. 2 shows a perspective view, partly sectioned, of a portion of an exemplary compressor section 14 of gas turbine engine 10 of FIG. 1. Compressor section 14 includes inner shroud 32 and outer shroud 34 with annular gas path 22 defined between inner shroud 32 and outer shroud 34. Annular gas path 22 may be in serial flow communication with upstream gas turbine engine inlet 21, rotors and stators, and downstream rotors, stators and downstream gas turbine engine 10 outlet 23. Each of the rotors may include one or more rows of circumferentially spaced rotor blades. One or more rotors may have one or more associated stators located upstream thereof. Examples of stators may include struts and vanes. Vanes 24 can be fixed orientation or variable orientation guide vanes (referred hereinafter as VGVs). Examples of rotors include fans, compressor rotors (e.g. impellers), and turbine rotors (e.g. those downstream of the combustion chamber). VGVs 24 lie in the substantially annular gas path, extending radially between inner shroud 32 and outer shroud 34. "Extending radially" as used herein does not necessarily imply extending perfectly radially along a ray perfectly perpendicular to the central axis 20, but is intended to encompass a direction of extension that has a radial component relative to the central axis 20. VGVs 24 are arranged to define a circumferential row (circular array) of VGVs 24 angularly spaced-apart around central axis 20. VGVs 24 may be disposed downstream of another stator and upstream of a rotor. For example, VGVs 24 may be disposed upstream of bladed rotor 64. Each of VGVs 24 may have leading edge 26 and trailing edge 28.

The orientation of VGVs 24 can be varied to change the direction towards which leading and trailing edges (26 and 28 respectively) are pointing. The orientation of VGVs 24 may be varied automatically and/or based on a pilot command via a controller (e.g., full authority digital engine controller (FADEC)) of gas turbine engine 10 for example. An orientation of one of VGVs 24 may be varied by changing its pitch angle about axis 30. Axis 30 may be in a substantially radial direction with respect to central axis 20 and may define a pivot point P. The orientation of all VGVs 24 may be simultaneously varied by means of unison ring 36 connected to actuating system 40. Connector links 38 may separately connect each of VGVs 24 to unison ring 36. VGVs 24 may have an orientation where a flow of gas past VGVs 24 is substantially obstructed. In this orientation, the pitch angle of VGVs 24 may be such that the surface (or planform) area of VGVs 24 that is perpendicular to the oncoming flow is increased. For example, by varying the pitch of VGVs 24, the angle between the oncoming flow and leading/trailing edges (26 and 28, respectively) of VGVs 24 may be varied. At a larger angle, the flow may be obstructed more. VGVs 24 may have an orientation where a flow of gas past the VGVs 24 is substantially unobstructed. In this orientation, the pitch angle of VGVs 24 may be such that the surface (or planform) area of VGVs 24 that is perpendicular to the oncoming flow is decreased. For example, at a smaller angle between the oncoming flow and leading/trailing edges (26 and 28, respectively) of VGVs 24, the flow may be obstructed less.

Figure 3:
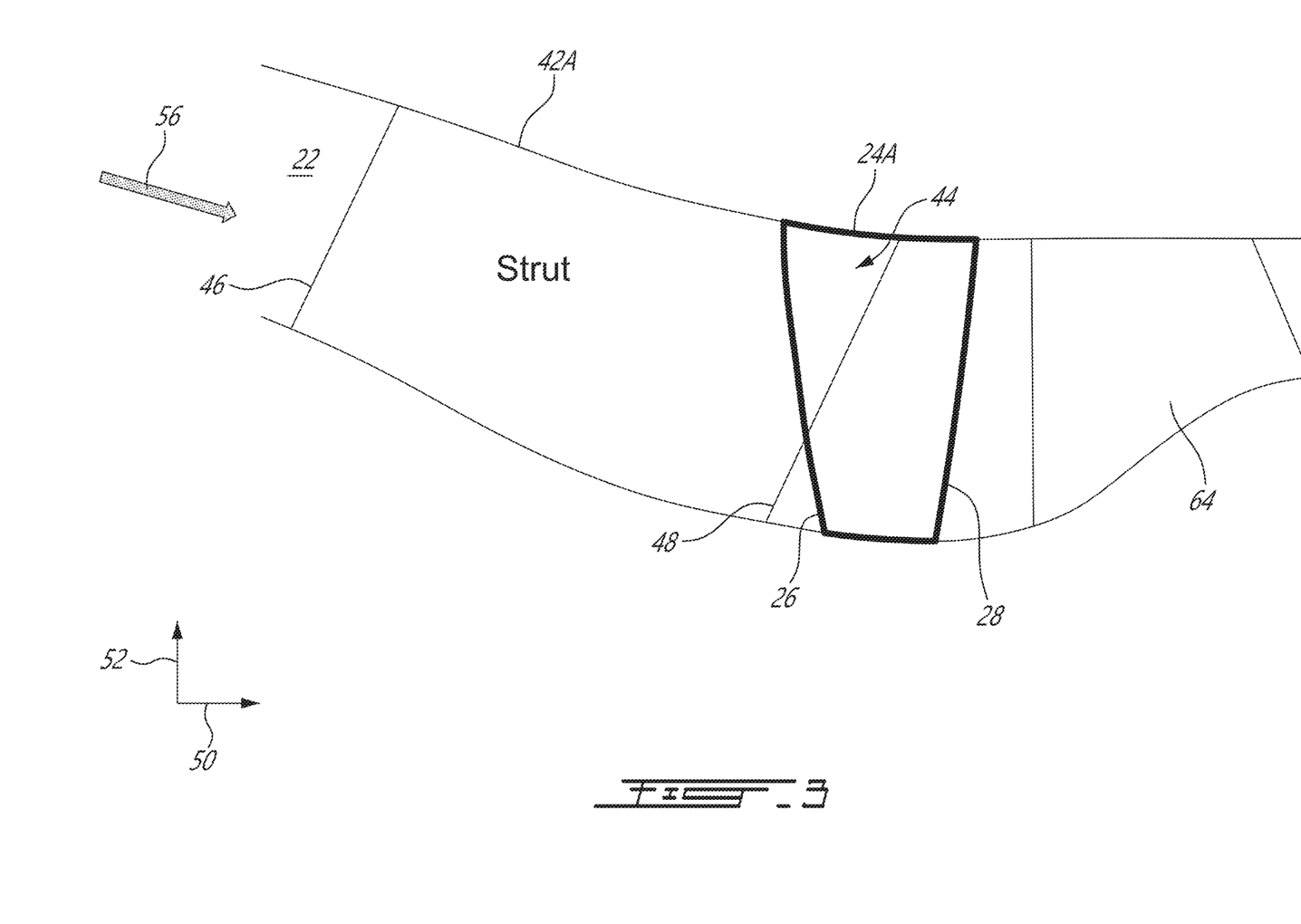
FIG. 3 shows a schematic side view of a variable orientation guide vane and a strut.

FIG. 3 shows a schematic side view of exemplary VGV 24A and strut 42A. VGV 24A is axially overlapping a portion 44 of strut 42A, and may be positioned between two adjacent struts 42 (e.g. pair indicated by 66 in FIGS. 4 and 5) in strut passage 54 defined therebetween. Strut 42A is configured to interact with the flow of air 56.

Figure 4:
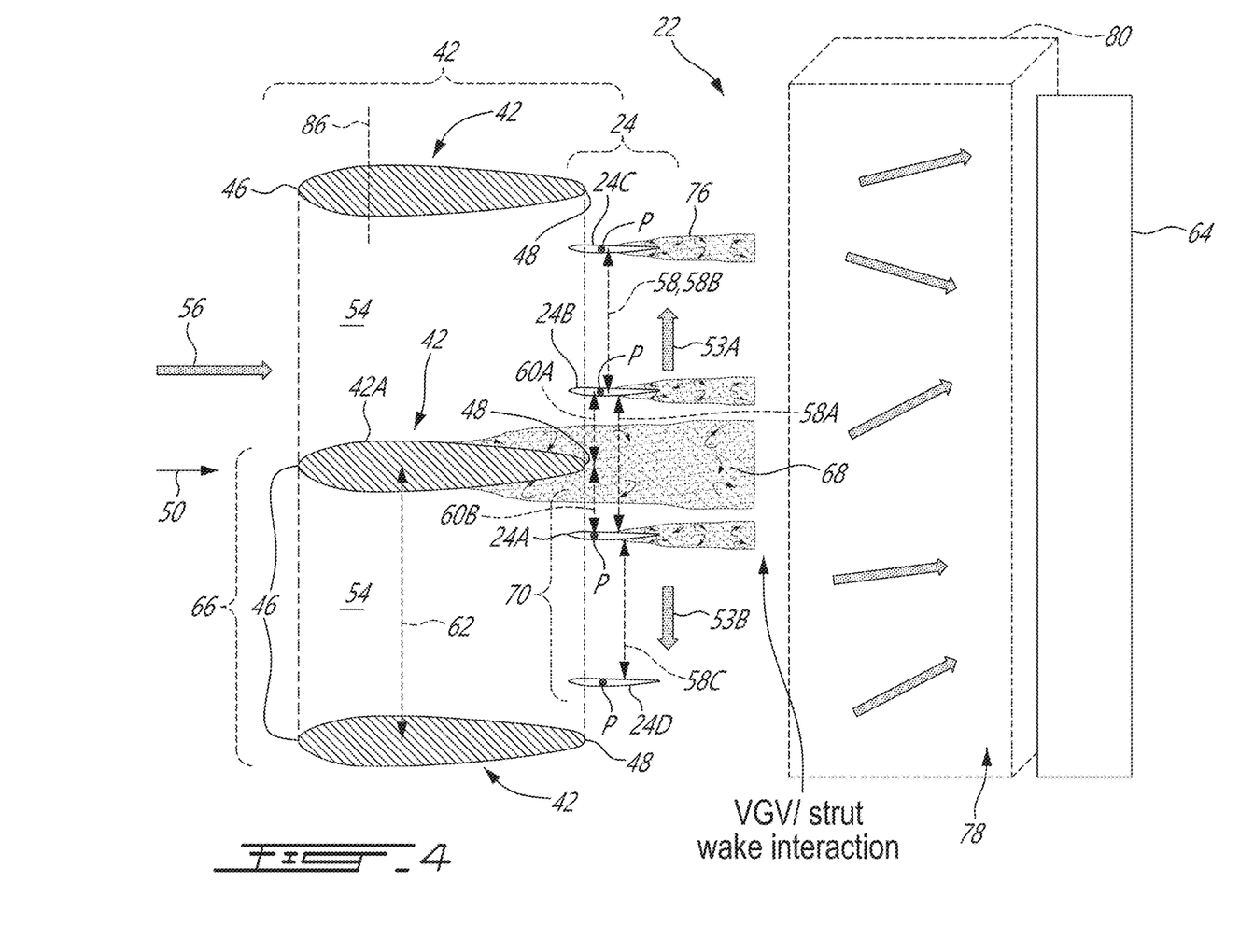
FIG. 4 shows a schematic view of an arrangement of struts and variable orientation guide vanes with the variable orientation guide vanes shown in a first (e.g., fully open) position.
Figure 4A:
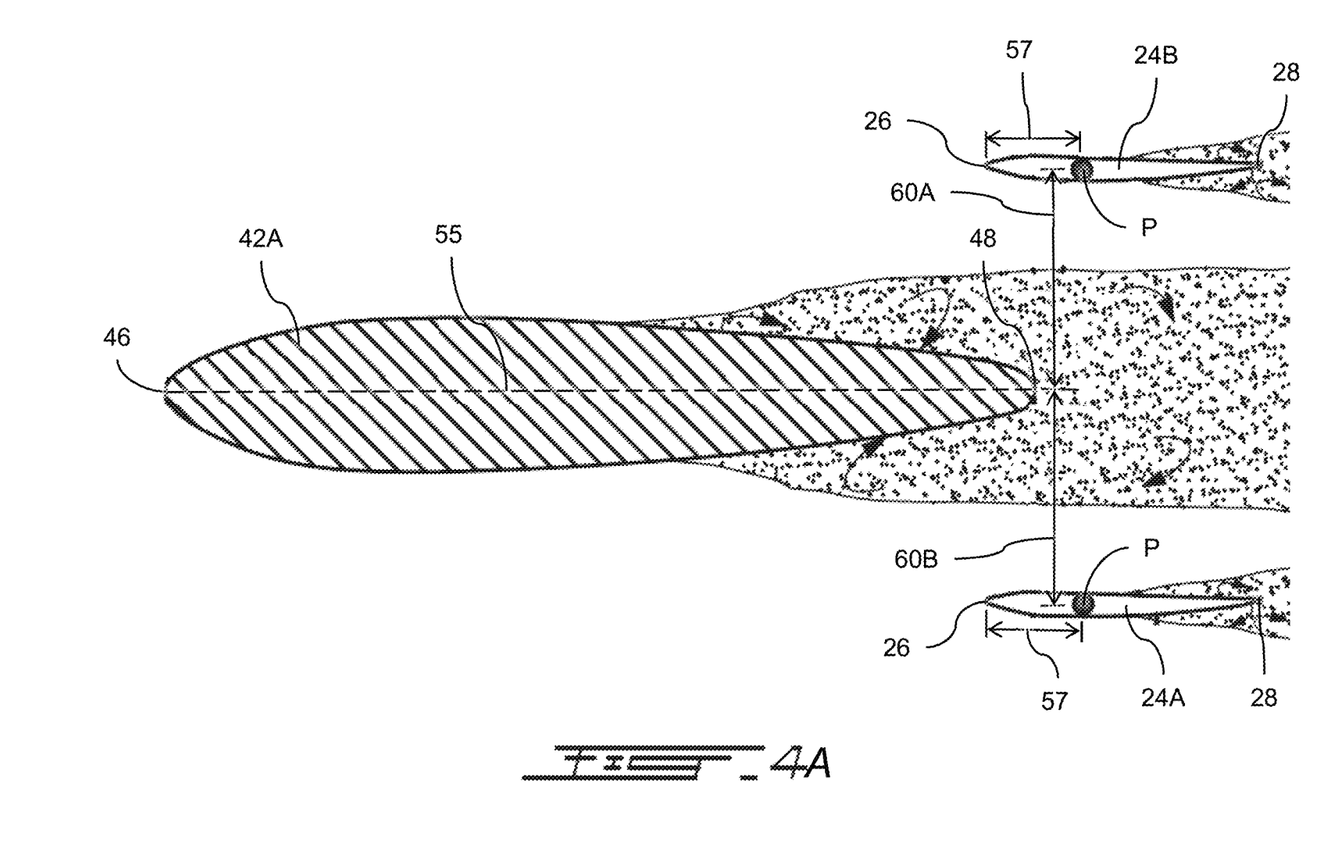
FIG. 4A shows an enlarged portion of the arrangement of FIG. 4 showing one strut and two variable orientation guide vanes.
Figure 5:
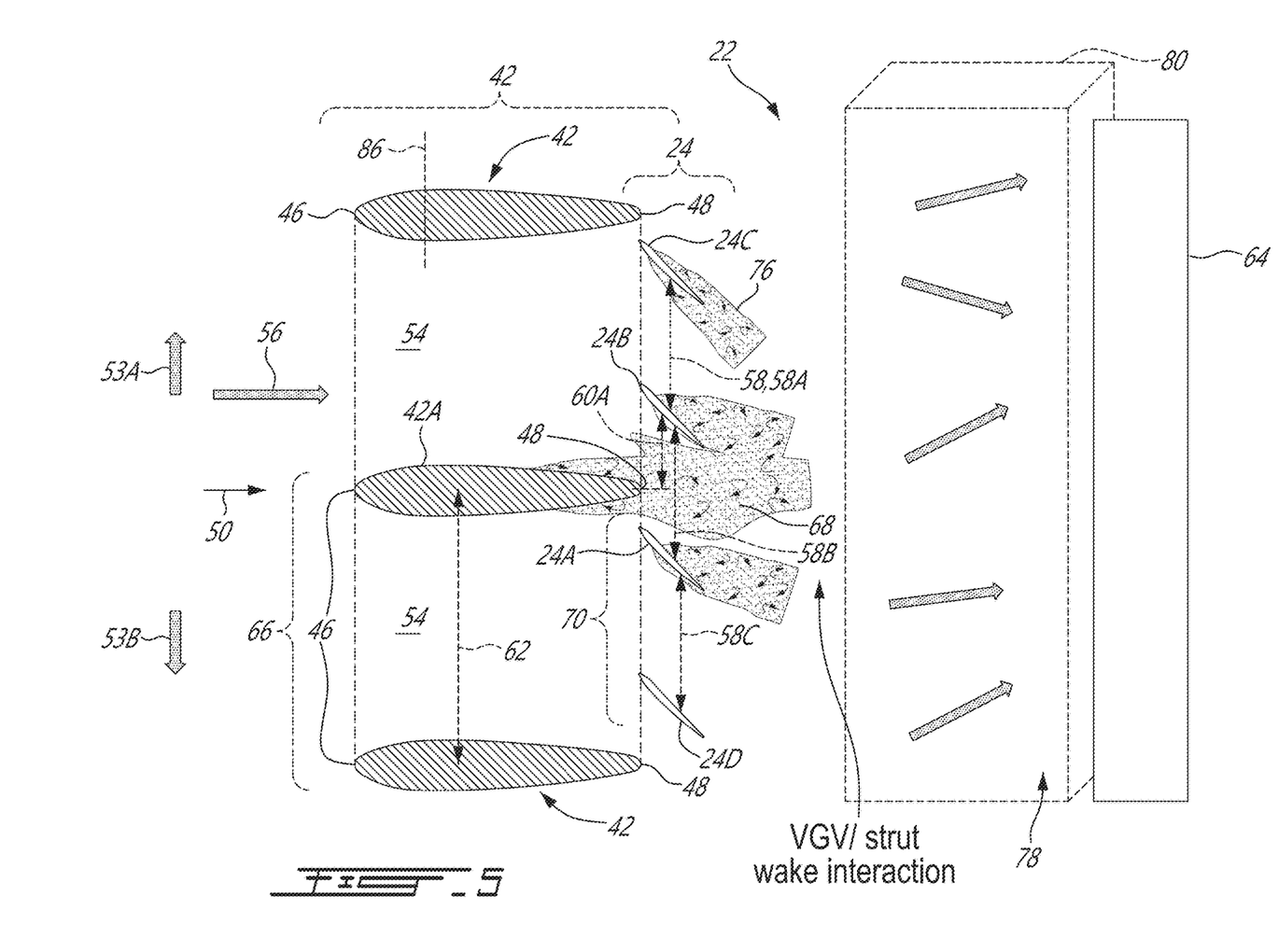
FIG. 5 shows a schematic view of an arrangement of struts and variable orientation guide vanes with the variable orientation guide vanes shown in a second (e.g., partially closed) position.

FIGS. 4, 4A and 5 show schematic views of an arrangement of struts 42 and VGVs 24. In FIG. 4, VGVs 24 arranged in a circumferential row around central axis 20 are in a first (e.g. fully open) position. In FIG. 5, VGVs 24 arranged in a circumferential row around central axis 20 are in a second (e.g. partially closed) position. The fully open position may be referred to a design condition. The second position may be referred to an off-design condition. In some embodiments, the design condition is defined as an operating condition for which a design of gas turbine engine 10 may be optimized and intended to spend most of its operational life. For example, the design condition may be a level-cruise condition of an aircraft to which gas turbine engine 10 is mounted. The design condition may include a throttle lever setting, a range of gas turbine engine speeds expressed as revolutions-per-minute (RPM) and/or other engine-related parameter. In some embodiments, the off-design conditions may include a takeoff, climb and/or landing phase of flight of the aircraft and its associate operating setting of gas turbine engine 10 for example. The off-design condition may be any condition different from (other than) the design condition.

FIG. 4A shows an enlarged portion of the arrangement of FIG. 4 showing strut 42A and two adjacent VGVs 24 such as neighbouring VGVs 24A, 24B as an example. However, the relationship between strut 42A and VGVs 24A, 24B shown in FIG. 4A may also apply to other struts 42 and VGVs 24 of compressor section 14. Strut 42A may be angularly positioned around central axis 20 to be angularly between VGVs 24A, 24B. One or both of VGVs 24A, 24B may be pivotable about pivot point P which may be defined by axis 30 shown in FIG. 2.

In some embodiments, the angular positions and dimensions of one or both VGVs 24A, 24B may be configured so that leading edges 26 of VGVs 24 at one or more radial positions along respective VGVs 24A, 24B do not extend directly behind vane 42A when VGVs 24A, 24B are rotated about their respective pivots points P between their respective first (e.g. fully open) positions and second (e.g. partially closed) positions, which may be beyond (i.e., past) the second position shown in FIG. 5. For example, the angular positions and dimensions of one or both VGVs 24A, 24B may be configured so that leading edges 26 of VGVs 24A, 24B do not cross from one side of an extension of chord line 55 of strut 42A to another when being rotated about their respective pivots points P. In some embodiments, angular strut-vane spacing 60A between strut 42A and VGV 24B may be greater than chordwise distance 57 between leading edge 26 of VGV 24B and pivot point P of VGV 24B (i.e., strut-vane spacing 60A>chordwise distance 57). Accordingly, as VGV 24B is rotated about pivot point P, leading edge 26 of VGV 24B may not intersect an extension of chord line 55 of strut 42A. In other words, chordwise distance 57 between leading edge 26 of VGV 24B and pivot point P of VGV 24B may be smaller than strut-vane spacing 60A between strut 42A and VGV 24B.

In some embodiments, angular strut-vane spacing 60B between strut 42A and VGV 24A may be greater than chordwise distance 57 between leading edge 26 of VGV 24A and pivot point P of VGV 24A (i.e., strut-vane spacing 60B>chordwise distance 57). Accordingly, as VGV 24A is rotated about pivot point P, leading edge 26 of VGV 24A may not intersect an extension of chord line 55 of strut 42A. In other words, chordwise distance 57 between leading edge 26 of VGV 24A and pivot point P of VGV 24A may be smaller than strut-vane spacing 60B between strut 42A and VGV 24A.

In some embodiments, strut-vane spacing 60B between strut 42A and VGV 24A may be different from strut-vane spacing 60A between strut 42A and VGV 24B.

In reference to FIGS. 4, 4A and 5, the exemplary assembly may comprise a circumferential row of struts 42 extending radially in gas path 22. Struts 42 may be configured to receive a flow of air 56 to impinge thereupon. Struts 42 may each have an airfoil profile with an associated leading edge 46 and trailing edge 48. Struts 42 may be designed as relatively thick (in a circumferential dimension) and optionally hollow airfoils with a relatively large chord length (e.g., chord line 55) which is measured between leading and trailing edges (46 and 48, respectively) of the airfoil, in order to bear structural (e.g., thrust) loads between components (e.g., casings) of gas turbine engine 10. The airfoil profile of struts 42 may be selected to modify the flow downstream of struts 42. Struts 42 may extend between outer shroud 34 and inner shroud 32. Struts 42 may be uniformly or non-uniformly angularly spaced-apart around central axis 20. Struts 42 may be oriented based on the oncoming flow conditions or struts 42 may be oriented based on local flow conditions. Two adjacent struts (pair indicated by 66) have a space in between which defines strut passage 54. Struts 42 may have respective strut wakes 68 in gas path 22 passing across the assembly. As referred to herein "wake" refers to a region of disturbed flow downstream of a solid body.

The assembly may further include a circumferential row of VGVs 24. The number of VGVs 24 may exceed the number of struts 42. Each of VGVs 24 may have an airfoil shape with associated leading edge 26 and trailing edges 28. VGVs 24 may have pressure and suction surfaces defined between leading edge 26 and trailing edges 28. In some embodiments, VGVs 24 may be symmetric so that at a zero angle of attack, the pressure and suction surfaces cannot be distinguished. Each of VGVs 24 may be configured to be smaller than one of struts 42 proximal thereto either in airfoil thickness (e.g., the maximum thickness between the pressure and suction surfaces) and/or in chord length. The circumferential row of VGVs 24 is upstream of bladed rotor 64.

In some embodiments, the assembly includes a circular array of VGVs 24 about the central axis 20. The VGVs 24 may, but not necessarily, all be positioned at substantially the same axial location relative to the central axis 20. In various embodiments, the angular spacing of the VGVs 24 and struts 42 may be configured so that two, three or more VGVs 24 are angularly disposed between two neighbouring struts 42.

The VGVs 24 may include a pair of VGVs 24A, 24B straddling a strut 42A of the plurality of struts 42. For example, VGVs 24A, 24B straddling the strut 42A may refer to having a VGV on either side of the strut 42A and both positioned so as to modify or interact with a wake of the strut 42A by, for example, inducing channel-like flows in intervening regions between VGVs 24A, 24B and strut 42A. The pair of VGVs 24A, 24B may be spaced apart from each other by a first circumferential distance 58A. The VGVs 24 may include a first VGV 24C disposed at a second circumferential distance 58B (equal to the first circumferential distance 58A) away from one VGV 24B of the pair of VGVs in a first circumferential direction 53A about the central axis 20. The VGVs 24 may include a second VGV 24D disposed at a third circumferential distance 58C away from another VGV 24A of the pair of VGVs in a second circumferential direction 53B about the central axis 20, the second circumferential direction 53B being opposite the first circumferential direction 53A. The first, second, and third circumferential distances (58A, 58B and 58C) may be inter-vane spacings. The first, second, and third circumferential distances (58A, 58B and 58C) may be measured along a radially outer surface of the inner shroud 32 and may be (substantially) equal to each other.

One or more VGVs 24 have respective leading edges 26 axially overlapping strut passage 54. A portion of VGVs 24 may be contained within strut passage 54. Respective trailing edges 28 of one or more VGVs 24 may be disposed downstream of strut passage 54. In some embodiments, leading edges 26 of one or more VGVs 24 overlap strut passage 54 but are axially downstream of a location of maximum thickness (schematically marked a location 86) between opposing lateral (e.g., pressure and suction) surfaces of at least one of two adjacent struts 42 (pair indicated by 66) defining strut passage 54. In some embodiments, VGVs 24 may be tandem VGVs 24 wherein a first row of vanes is directly upstream of a second row of vanes.

In the embodiment shown in FIGS. 4, 4A and 5, VGVs 24 may be uniformly angularly spaced-apart around central axis 20. The angular distance between two adjacent (circumferentially closest) struts 42 (the pair indicated by 66) is defined as inter-strut spacing 62 extending between chords of the adjacent struts 42. A single assembly may have a plurality of inter-strut spacings 62, since struts 42 may not be uniformly angularly space-apart around central axis 20. The angular distance between two adjacent (circumferentially closest) VGVs 24 is defined as inter-vane spacing 58. Inter-vane spacing 58 associated with any two vanes 42 may be the same since VGVs 24 are uniformly angularly spaced-apart. The distance between one of VGVs 24 and one of struts 42 circumferentially closest thereto is defined as strut-vane spacing 60A. A single assembly may include a variety of strut-vane spacings 60A, since struts 42 may not be uniformly angularly space-apart around central axis 20. An or any inter-vane spacing 58 may be different than at least one of the strut-vane spacings.

In some embodiments, an angular position of strut 42A may be substantially equidistant from two adjacent vanes 24 when vanes 24 are disposed in the fully open position as shown in FIG. 4. In such embodiments, the angular spacings 60A and 60B may be substantially equal. Alternatively, strut 42A may not be angularly equally spaced between adjacent VGVs 24 so that the angular spacings 60A and 60B may be different. The angular spacings 60A and 60B may be taken from a pivot point P of a VGV 24 to a chord line 55 of strut 42.

VGVs 24 may also have respective VGV wakes 76 in gas path 22 flow passing across the assembly. Strut wakes 68 and VGV wakes 76 may interact and influence a downstream velocity. In some situations, channel-like flows between struts 42 and VGVs 24 may also interact. VGVs 24 thus distributed with respect to struts 42 and protruding within strut passage(s) 54 may cause a downstream overall component of velocity non-parallel to central axis 20 to be modified by the interaction with the flow of air in gas path 22. In some embodiments, strut wakes 68 are modified by interaction due to channel-like flows between struts 42 and VGVs 24. In some embodiments, the overall circumferential component of velocity is reduced. The downstream velocity may be a velocity in region 78 proximal to and upstream of rotor 64. Without being bound by a particular theory, in some embodiments, the interaction of VGVs 24 and strut wakes 68 may cause more desirable flow conditions upstream of rotor 64. Strut wakes 68 shown in FIGS. 4 and 5 are illustrative. In various embodiments, strut wakes 68 may be narrower or wider. In some embodiments, strut wakes 68 may only weakly interact (e.g. impinge) on the VGVs 24 or only weakly influence a flow proximal to the VGVs 24.

Overall velocity (or overall component of velocity) refers to a characteristic velocity. Velocity is a field quantity comprising a 3-D vector function of space and time, and particularly in a turbulent flow as may be present in gas turbine engine 10, acquires a chaotic pattern. For example, although a flow may be moving in a direction from inlet 21 of gas turbine engine 10 to outlet 23 at a certain speed on average, it may, locally in space-time, be moving in a completely different direction and at a different speed. For this reason, a characteristic velocity is used to characterize the flow. Thus, in some embodiments, an overall velocity (or overall component of velocity) may be a maximum or average velocity (or component of velocity) over some time period in an associated portion of gas path 22. In other embodiments, an overall velocity (or overall component of velocity) may be a conditional average, p-norm (for some integer p>0), filtered and averaged, mass-averaged velocity, or some other processed velocity (or component of velocity) over some time period in an associated portion of gas path 22. In an exemplary embodiment, the overall component of velocity non-parallel to central axis 20, downstream of VGVs 24 and in region 78 close to rotor 64, is the integral of the circumferential velocity over slice 80 of gas path 22 close to rotor 64 divided by the volume of the slice 80 and over a time period greater than a characteristic time associated with gas turbine engine 10 (e.g. time-scale associated with an engine RPM).

In embodiments having more numerous VGVs 24 than struts 42, for VGVs 24 overlapping strut passage(s) 54, the pattern of circumferential spacings 60A between struts 42 and VGVs 24 leads to a strut-vane spacing 60A smaller than any inter-vane 58 or inter-strut spacing 62. The respective small strut-vane spacing 60A may confine strut wake 68, which may eventually impinge on one of VGVs 24 or otherwise interact with a flow around a VGV 24 and disrupt strut wake 68 flow structures, e.g. by attenuating large-scale (and more energetic) turbulent eddies. The strut-vane spacing 60A may also confine channel-like flows between struts 42 and VGVs 24 and thereby may, in some embodiments, cause strut wakes 68 to be modified by interaction due to the channel-like flows between struts 42 and VGVs 24. In some embodiments, a wake vortex (e.g. a coherent vortex flow structure) shedding from a strut 42 may be disrupted by the interaction (e.g., impingement). As a result of disrupted strut wake 68 downstream of the assembly, an overall circumferential component of velocity non-parallel to central axis 20 of gas turbine engine 10 may be reduced, thereby potentially increasing efficiency of downstream rotor 64. In some embodiments, reduced distortion or disruption in the flow may also help in improve the operable range of the compressor.

Figure 6A:
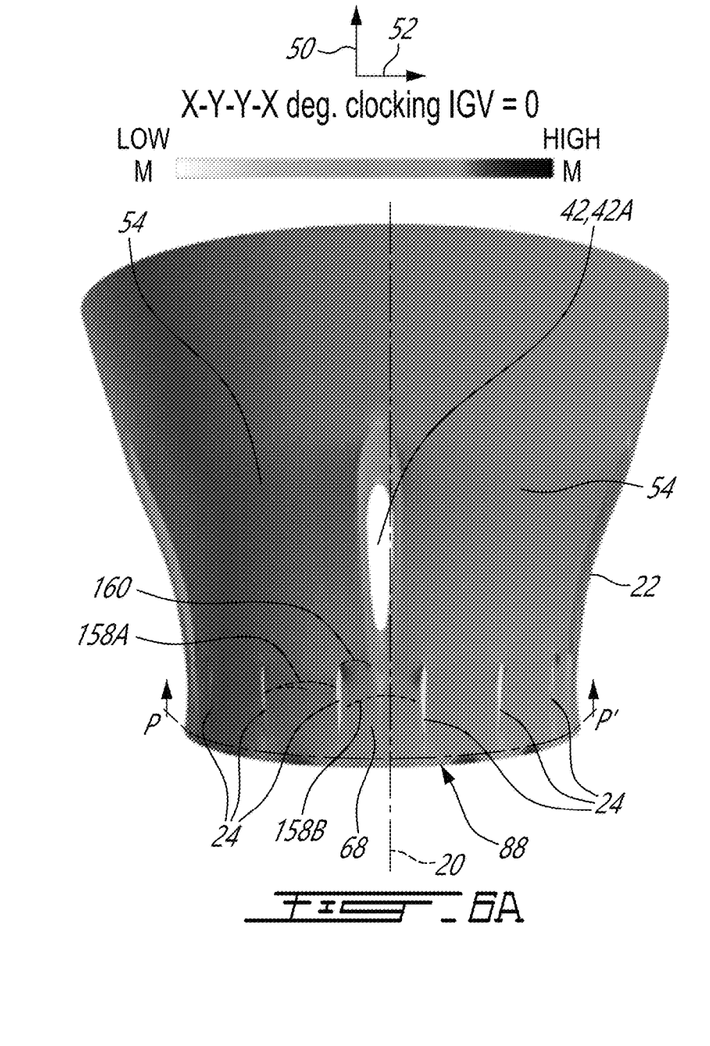
FIG. 6A is a top perspective view of Mach number contours (represented by shading) of an exemplary gas path of the gas turbine engine of FIG. 1 with uniform angular spacing between variable orientation guide vanes and with uniform angular spacing between struts when the variable orientation guide vanes are at a design condition.

FIG. 6A is a top perspective view of Mach number contours (shading) of an exemplary gas path of gas turbine engine 10 of FIG. 1 with uniform angular spacing between VGVs 24 where inter-vane spacings 158A and 158B are the same, and with uniform angular spacing between struts 42 (i.e. uniform inter-strut spacings), when VGVs 24 are at an exemplary design condition.

Figure 6B:
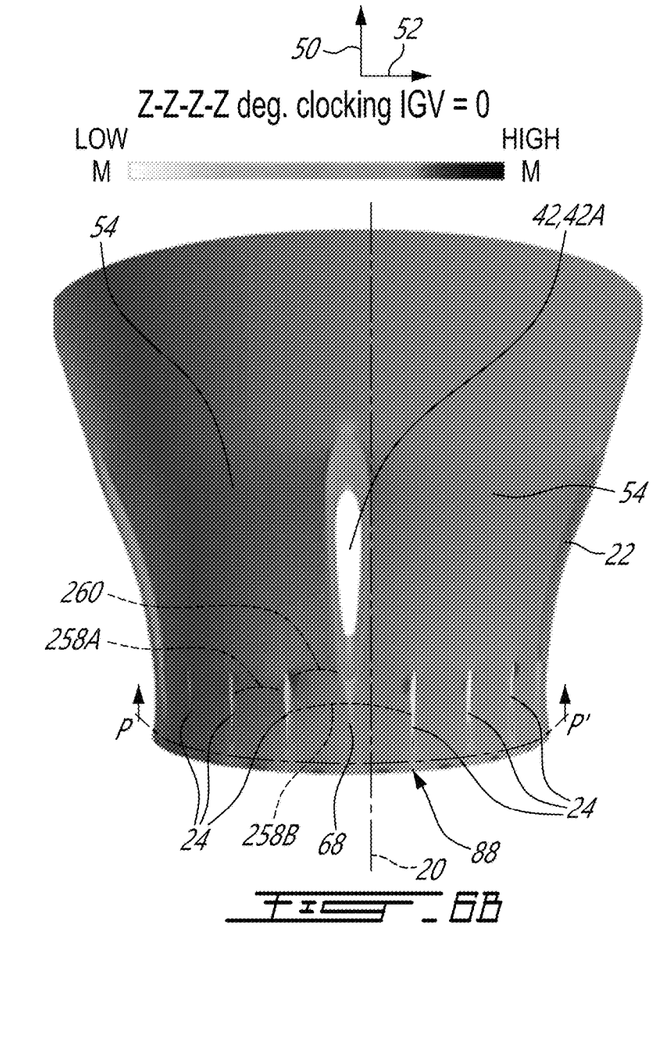
FIG. 6B is a top perspective view of other Mach number contours (represented by shading) of another exemplary gas path of the gas turbine engine of FIG. 1 with non-uniform angular spacing between variable orientation guide vanes when the variable orientation guide vanes are at the design condition.

FIG. 6B is a top perspective view of Mach number contours (shading) of another gas path of gas turbine engine 10 of FIG. 1 with non-uniform (e.g., irregular) angular spacing between VGVs 24 where inter-vane spacings 258A and 258B are not the same, when VGVs 24 are at the exemplary design condition.

In the exemplary embodiment of FIG. 6A, the assembly has strut-vane spacing 160 smaller than both inter-vane spacings 158A and 158B. In contrast, in the assembly of FIG. 6B, strut-vane spacing 260 is equal to inter-vane spacing 258A. As a result of this difference, the characteristics of the flow field in a region 88 downstream of struts 42, and particularly in region 78 close to rotor 64, are different in the exemplary embodiment of FIG. 6A as compared to the assembly shown in FIG. 6B. At the design condition of VGVs 24, the swirl of the flow field in region 78 or 88 of the exemplary embodiment of FIG. 6A may be similar or higher than the swirl in the flow in region 78 or 88 in the embodiment of FIG. 6B. At an off-design condition of VGVs 24, the swirl of the flow field in region 78 or 88 of the exemplary embodiment of FIG. 6A may be lower than the swirl in the flow in region 78 or 88 in the embodiment of FIG. 6B. The swirl may be the angle the velocity makes with streamwise direction, the maximum vorticity, or any other measure of the strength of non-parallel flow.

Figure 7A:
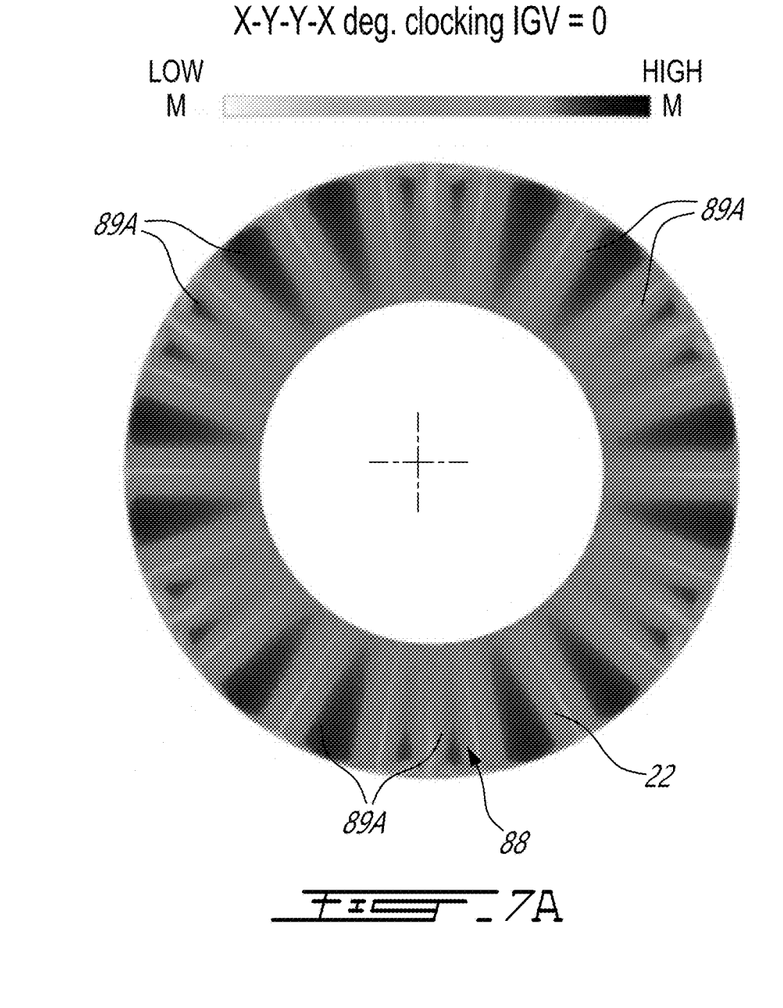
FIG. 7A is a cross-sectional view along a plane normal to a central axis of the gas path of FIG. 6A downstream of the variable orientation guide vanes.

FIG. 7A is a cross-sectional view, along a plane normal to central axis 20 of gas path 22 of FIG. 6A downstream of VGVs 24. The cutting plane for the cross-sectional view is indicated by broken line P-P' in FIG. 6A. As in FIG. 6A, contour shading indicates Mach number.

Figure 7B:
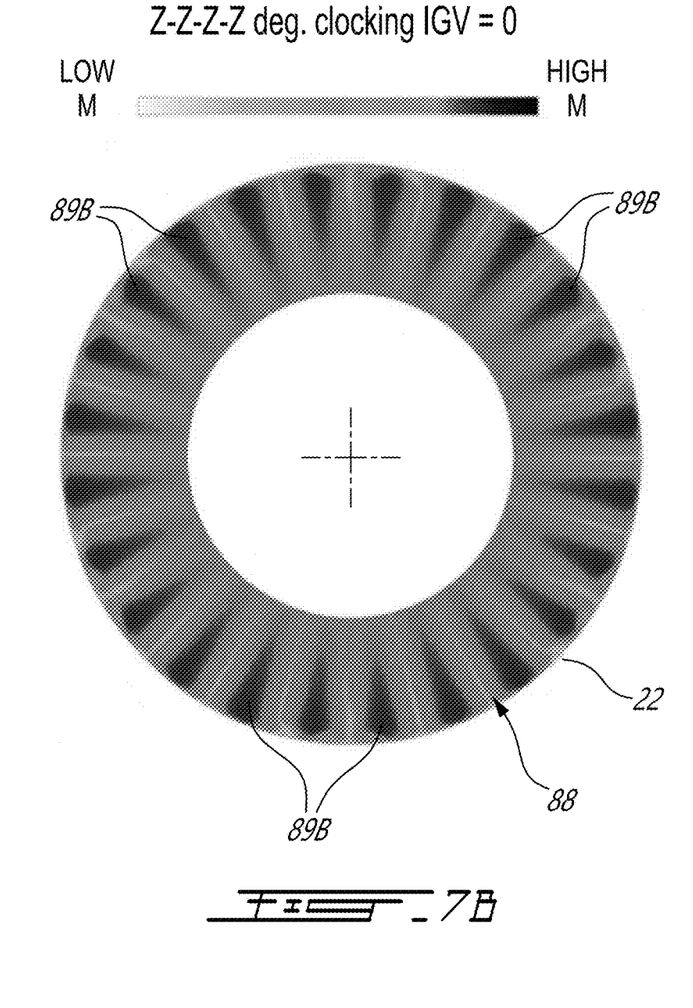
FIG. 7B is a cross-sectional view along a plane normal to the central axis of the gas path of FIG. 6B downstream of the variable orientation guide vanes.

FIG. 7B is a cross-sectional view, along a plane normal to central axis 20, of gas path 22 of FIG. 6B downstream of VGVs 24. The cutting plane for the cross-sectional view is indicated by the broken line P-P' in FIG. 6B. As in FIG. 6B, contour shading indicates Mach number.

Figure 8A:
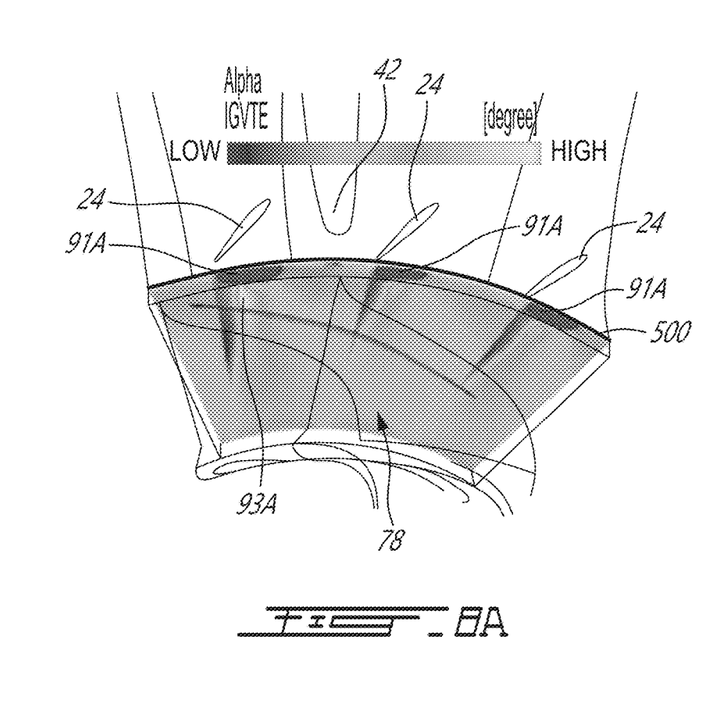
FIG. 8A is a combined enlarged cross-sectional view of the gas path downstream of the variable orientation guide vanes combining views along a plane normal to central axis (below dividing line) and a plane parallel to central axis (above dividing line) when the variable orientation guide vanes are at an off-design condition and are evenly spaced with respect to each other.

FIG. 8A is a combined enlarged cross-sectional view of the gas path 22 downstream of VGVs 24 and close to rotor 64, combining views along a plane normal to central axis 20 (below dividing line 500) and a plane parallel to central axis 20 (above dividing line 500), when VGVs 24 are at an off-design condition and are evenly spaced with respect to each other (compare to the configuration of FIG. 6A).

Figure 8B:
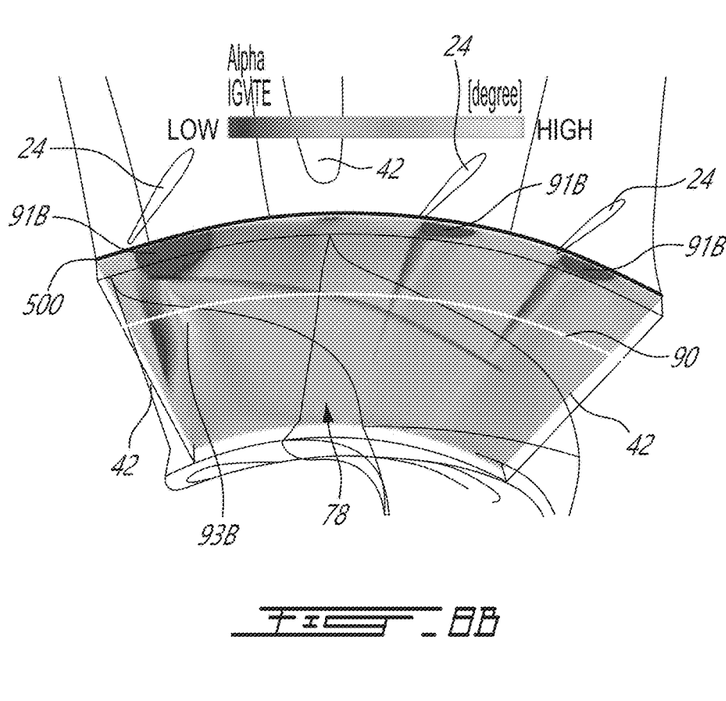
FIG. 8B is a combined enlarged cross-sectional view of the gas path downstream of the variable orientation guide vanes combining views along a plane normal to central axis (below dividing line) and a plane parallel to central axis (above dividing line) when the variable orientation guide vanes are at the off-design condition and are unevenly spaced with respect to each other.

FIG. 8B is a combined enlarged cross-sectional view of the gas path 22 downstream of VGVs 24 and close to rotor 64, combining views along a plane normal to central axis 20 (below dividing line 500) and a plane parallel to central axis 20 (above dividing line 500), when VGVs 24 are at an off-design condition and are evenly spaced with respect to struts 42 and each other, i.e. unevenly spaced with respect to each other (compare to the configuration of FIG. 6B).

In reference to both FIGS. 8A and 8B, the combined views show an angular portion of the annular gas path (the portion encompassing one strut 42). Contour shading indicates the angle (alpha) of the velocity with respect to axial direction 50. An angle (alpha) of zero may be desirable in some embodiments. Regions of relatively low alpha are shown at 91A and 91B. Regions of relatively high alpha are shown at 93A and 93B. FIG. 8A shows the exemplary embodiment of FIG. 6A at an off-design condition. FIG. 8B shows the assembly of FIG. 6B at an off-design condition. As mentioned previously, the swirl (here quantified using alpha) may be lower in the embodiment of FIG. 6A at an off-design condition compared to the assembly of FIG. 6B.

FIGS. 8A and 8B show that the exemplary embodiment of FIG. 6A has a less overall non-parallel flow in relation to the assembly of FIG. 6B, at an off-design condition. Such a flow condition may arise because of the confinement of strut wake 68 between VGVs 24, which may lead to attenuation of strut wake 68, in the exemplary embodiment, at an off-design condition. Additionally, confinement may encourage mixing of VGV wakes 76 and strut wakes 68 (see FIG. 5), which may cause attenuation of strut wake 68 in region 78. For example, such an attenuation may be caused by vortex interaction between strut wakes 68 and VGV wakes 76 which in turn may accelerate a turbulent cascade breaking up large-scale (and more energetic) vortical structures into small-scale (and less energetic) vortical structures that can be more efficiently viscously dissipated. Without such confinement-specific effects, the vortical structures may be longer-lived and may decay more slowly. When strut wake 68 is (e.g., tightly) confined between two VGVs 24, as in the exemplary embodiment, the flow in region 78 may be more diffuse and sharp gradients in Mach number may not be as prevalent as when there is less confinement, as in the assembly of FIGS. 8B and 6B. Sharp gradients may be associated with increased vorticity (shear tilting of the flow), which may lead to undesirable non-parallel flow further downstream in region 78 close to rotor 64.

Figure 9:
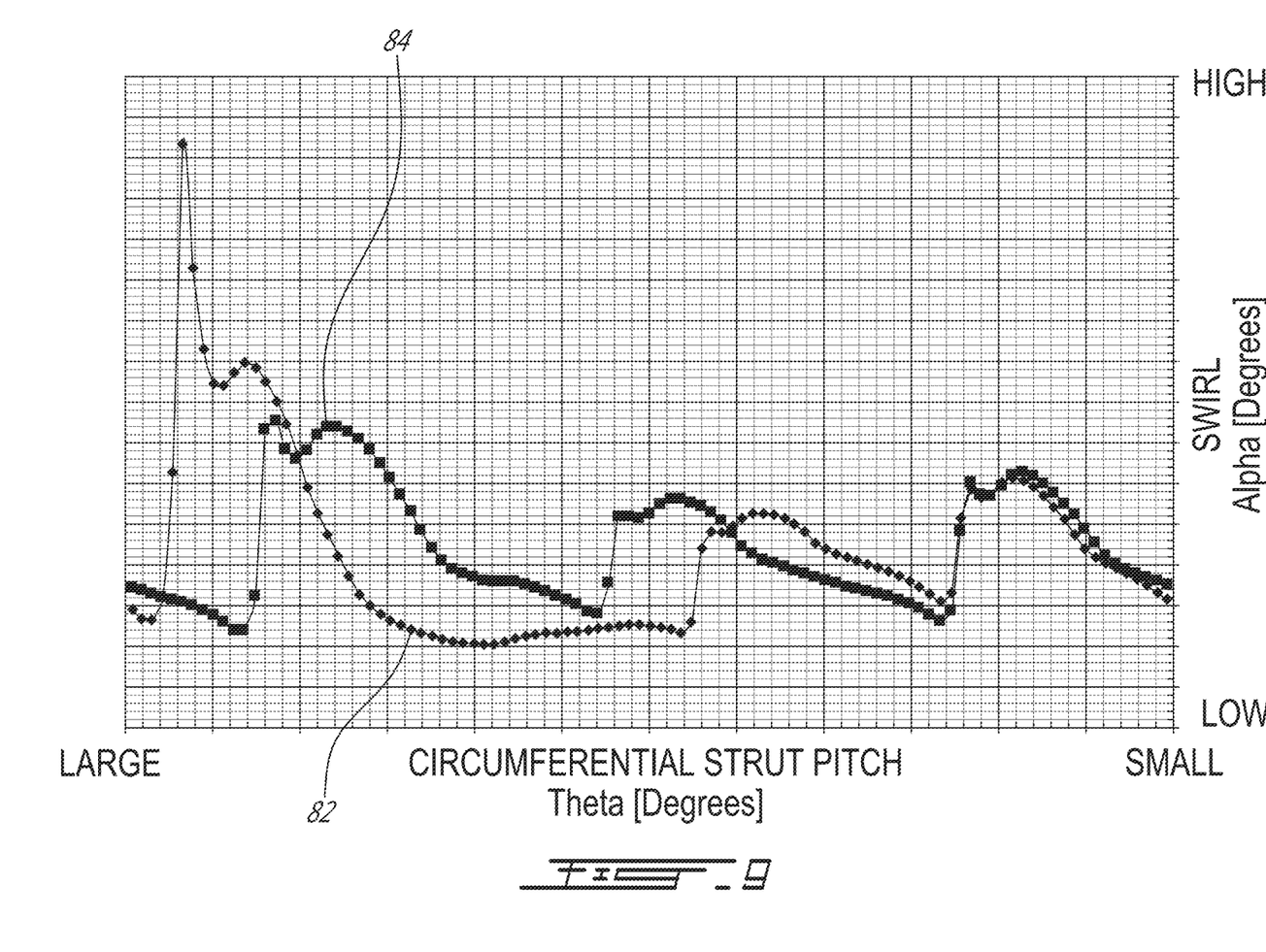
FIG. 9 is an illustrative graph of an angle (alpha) of the velocity of the air downstream of the variable orientation guide vanes with respect to the central axis, e.g. at a fixed radial location or an average across multiple fixed radial locations and as a function of an angular spacing (theta) between two adjacent struts for the gas paths of FIGS. 8A and 8B.

FIG. 9 is an illustrative graph of the angle (alpha) of the velocity downstream of VGVs 24 with respect to central axis 20, e.g. at a fixed radial location or an average across multiple fixed radial locations, and as a function of the angular spacing (theta) between two adjacent struts 42, for the gas paths of FIGS. 6A and 6B. Plots 82 and 84 represent or are indicative of the values of the contours of FIGS. 8A and 8B (respectively) at a fixed radial distance. An example fixed radial distance 90 is indicated in FIG. 8B for illustrative purposes. Plot 84 is associated with the exemplary embodiment of FIG. 8A, and plot 82 is associated with the assembly of FIG. 8B. As shown in the graph, when the strut-vane spacing 60A is smaller than inter-vane spacing 58 (see FIGS. 4 and 5), the maximum circumferential component of velocity may be reduced as compared to when the strut-vane spacing 60A is equal to inter-vane spacing 58.

Figure 10:
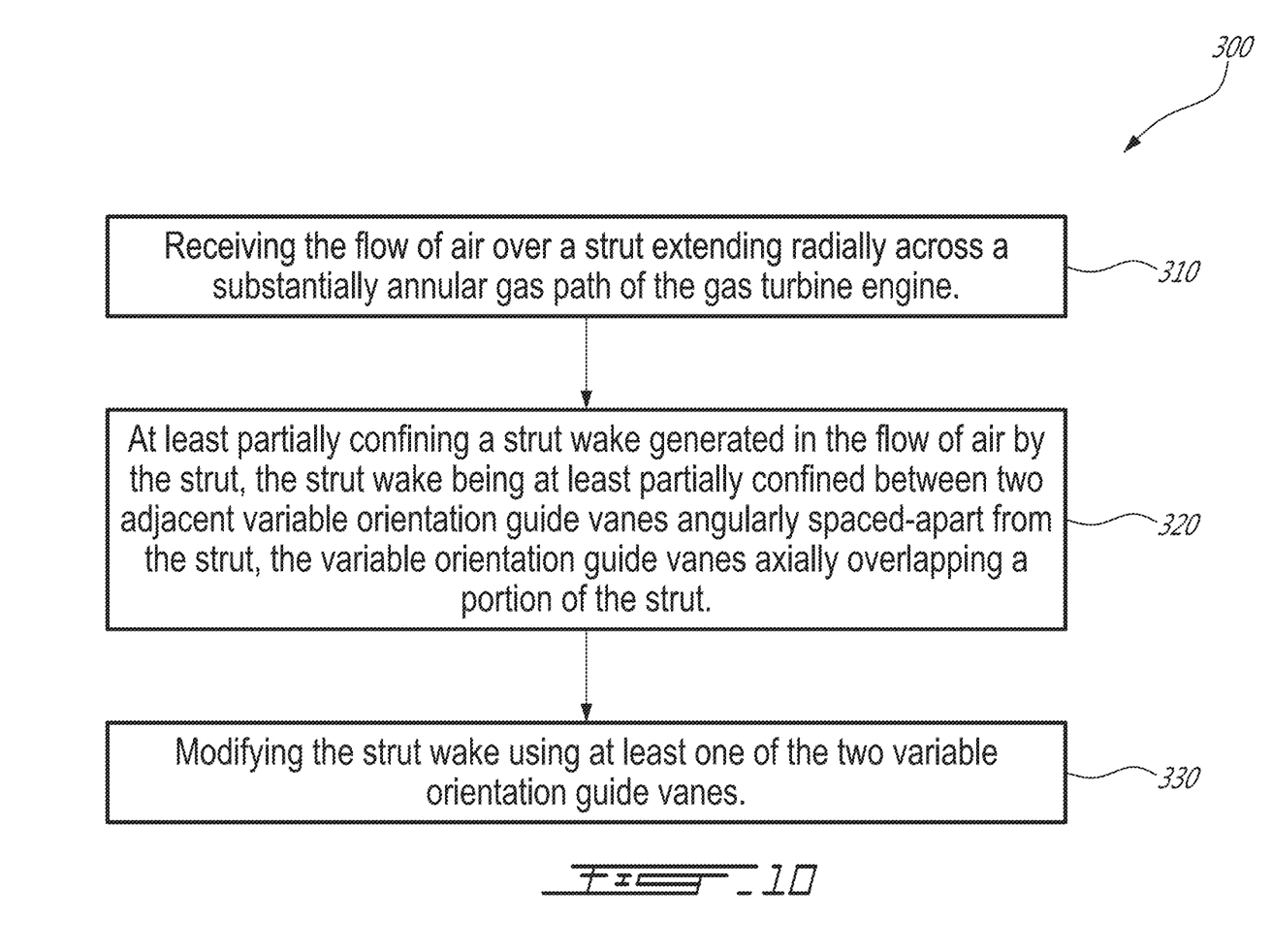
FIG. 10 is a flowchart illustrating an exemplary method of directing a flow of air through a compressor section of a gas turbine engine.

FIG. 10 is a flowchart illustrating an exemplary method 300 of directing a flow of air through compressor section 14 of gas turbine engine 10. Method 300 may be carried out using assemblies as disclosed herein. Method 300 includes:

- receiving the flow of air over strut 42 extending radially across a substantially annular gas path 22 of gas turbine engine 10, gas path 22 having central axis 20 (see block 310);
- at least partially confining strut wake 68 generated in the flow of air by strut 42, strut wake 68 being at least partially confined between two adjacent variable orientation guide vanes 24 angularly spaced-apart from strut 42, variable orientation guide vanes 24 axially overlapping a portion of strut 42 relative to central axis 20 (see block 320); and
- modifying strut wake 68 using at least one of the two variable orientation guide vanes 24 (see block 330).

In some embodiments, modifying strut wake 68 includes permitting strut wake 68 to interact (e.g. impinge) on at least one of the two variable orientation guide vanes 24.

Some embodiments include permitting at least one vortex shed from strut 42 to interact (e.g. impinge) on the at least one of the two variable orientation guide vanes 24 to reduce an overall component of velocity of the flow of air non-parallel to central axis 20.

In some embodiments, an angular spacing between the two variable orientation guide vanes 24 relative to central axis 20 is configured to reduce an overall component of velocity of the flow of air downstream of strut 42.

In some embodiments, the overall component of velocity is normal to central axis 20 in a region downstream of the two variable orientation guide vanes 24.

In some embodiments, modifying the strut wake 68 includes attenuating strut wake 68 using a variable orientation guide vane wake 76 generated in the flow of air by at least one of the two variable orientation guide vanes 24.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An assembly for a compressor section of a gas turbine engine, the assembly comprising:
an outer shroud and an inner shroud defining a substantially annular gas path therebetween, the gas path having a central axis and extending axially along the central axis;
a plurality of struts extending radially in the gas path, the struts being angularly spaced-apart around the central axis, two adjacent struts defining a strut passage therebetween, the strut passage extending axially along the central axis between leading edges of the two adjacent struts and trailing edges of the two adjacent struts; and
a plurality of variable orientation guide vanes extending radially in the gas path, the variable orientation guide vanes being uniformly angularly spaced-apart around the central axis, two adjacent variable orientation guide vanes of the plurality of variable orientation guide vanes having a leading edge axially overlapping the strut passage at one or more orientations of the two adjacent variable orientation guide vanes,
wherein:
one of the plurality of struts is angularly positioned between the two adjacent variable orientation guide vanes;
a first of the two adjacent variable orientation guide vanes is pivotable about a pivot point; and
a first angular spacing between the one strut and the first of the two adjacent variable orientation guide vanes is greater than a chordwise distance between the leading edge of the first of the two adjacent variable orientation guide vanes and the pivot point.

2. The assembly of claim 1, wherein the first angular spacing between the one strut and the first of the two adjacent variable orientation guide vanes is substantially equal to a second angular spacing between the one strut and a second of the two adjacent variable orientation guide vanes.

3. The assembly of claim 1, wherein the first angular spacing between the one strut and the first of the two adjacent variable orientation guide vanes is different from a second angular spacing between the one strut and a second of the two adjacent variable orientation guide vanes.

4. The assembly of claim 1, including a greater number of the plurality of variable orientation guide vanes than the plurality of struts.

5. The assembly of claim 1, wherein the two adjacent variable orientation guide vanes have a trailing edge disposed outside of the strut passage.

6. The assembly of claim 1, wherein the plurality of variable orientation guide vanes are axially positioned downstream of an axial position of maximum thickness of the struts.

7. The assembly of claim 1, wherein the struts are uniformly angularly spaced-apart around the central axis.

8. The assembly of claim 1, wherein:
the plurality of variable orientation guide vanes have a same axial position;
the two adjacent variable orientation guide vanes are spaced apart from each other by a first circumferential distance;
the plurality of variable orientation guide vanes include:
a third variable orientation guide vane of the plurality of variable orientation guide vanes disposed at a second circumferential distance away from the first of the two adjacent variable orientation guide vanes in a first circumferential direction about the central axis; and
a fourth variable orientation guide vane of the plurality of variable orientation guide vanes disposed at a third circumferential distance away from a second of the two adjacent variable orientation guide vanes in a second circumferential direction about the central axis, the second circumferential direction being opposite the first circumferential direction; and
the first, second, and third circumferential distances are measured along a radially outer surface of the inner shroud and are equal to each other.

9. A gas turbine engine comprising:
a compressor for pressurizing air;
a combustor in which compressed air from the compressor is mixed with fuel and ignited for generating a stream of hot combustion gases; and
a turbine section for extracting energy from the combustion gases;
the compressor including:
a substantially annular gas path having a central axis and extending axially along the central axis;
a strut extending radially in the gas path;
a strut passage defined in the gas path, the strut passage extending axially along the central axis between a leading edge of the strut and a trailing edge of the strut;
a plurality of variable orientation guide vanes extending radially in the gas path, the variable orientation guide vanes being uniformly angularly spaced-apart around the central axis, two adjacent variable orientation guide vanes of the plurality of variable orientation guide vanes having a leading edge axially overlapping the strut passage and a trailing edge disposed downstream of the strut passage at one or more orientations of the two adjacent variable orientation guide vanes; and
a rotor disposed downstream of the plurality of variable orientation guide vanes and configured to compress the air,
wherein:
the strut is angularly positioned between the two adjacent variable orientation guide vanes of the plurality of variable orientation guide vanes;
a first of the two adjacent variable orientation guide vanes is pivotable about a pivot point; and
a first angular spacing between the strut and the first of the two adjacent variable orientation guide vanes is greater than a chordwise distance between the leading edge of the first of the two adjacent variable orientation guide vanes and the pivot point.

10. The gas turbine engine of claim 9, wherein the first angular spacing between the strut and the first of the two adjacent variable orientation guide vanes is substantially equal to a second angular spacing between the strut and a second of the two adjacent variable orientation guide vanes.

11. The gas turbine engine of claim 9, wherein the first angular spacing between the strut and the first of the two adjacent variable orientation guide vanes is different from a second angular spacing between the strut and a second of the two adjacent variable orientation guide vanes.

12. The gas turbine engine of claim 9, wherein the plurality of variable orientation guide vanes are axially positioned downstream of an axial position of maximum thickness of the strut.

13. The gas turbine engine of claim 9, wherein the strut is one of a plurality of struts, the plurality of struts being angularly spaced-apart around the central axis and extending radially in the gas path.

* * * * *